T. A. B. PUTNAM.
Railroad-Signals.

No. 217,482. Patented July 15, 1879.

Witnesses:

Inventor
Theodore A. B. Putnam

UNITED STATES PATENT OFFICE.

THEODORE A. B. PUTNAM, OF NEW YORK, N. Y.

IMPROVEMENT IN RAILROAD-SIGNALS.

Specification forming part of Letters Patent No. 217,482, dated July 15, 1879; application filed March 11, 1879.

*To all whom it may concern:*

Be it known that I, THEODORE A. B. PUTNAM, of the city, county, and State of New York, have invented a new Signal for use on Railway-Trains; and that the following is a specification thereof.

The nature of my invention consists of a signal alternately appearing and disappearing, with a rate of movement proportioned to the speed of the moving train, and remaining motionless as a fixed signal during the periods of time that the train is not moving.

It is not designed to use colors exclusively for this signal, although they may be used in any variation. A change in form may be more striking to the eye at certain distances, and can be used. A concave reflector can be used, or any other device, to attract attention. The idea is simply that one part is fixed and another portion movable, the attention being attracted by the change in signal, the form and manner being optional.

The device herein described is for both a day and night signal, and may be used at the rear of a train, and also in front of a locomotive.

I will describe one manner of effecting the result.

Figure 1:
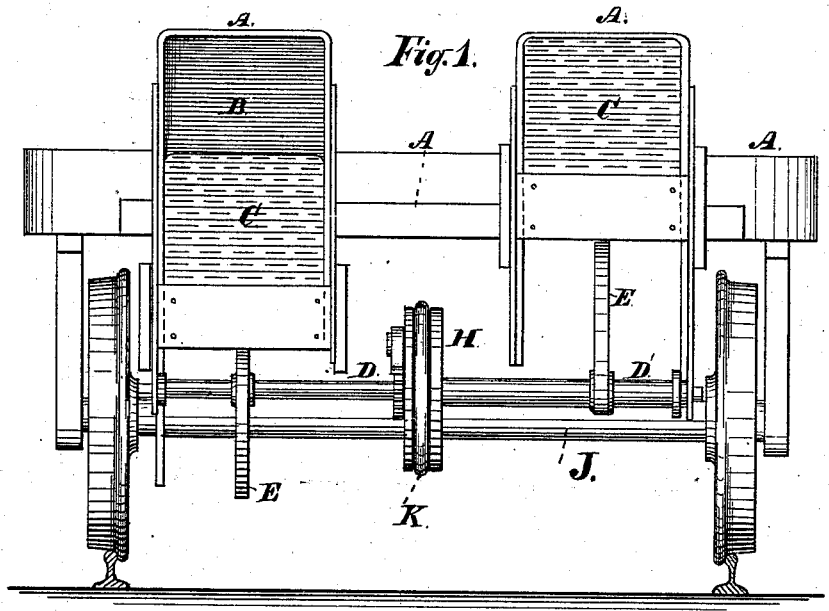
Figure 2:
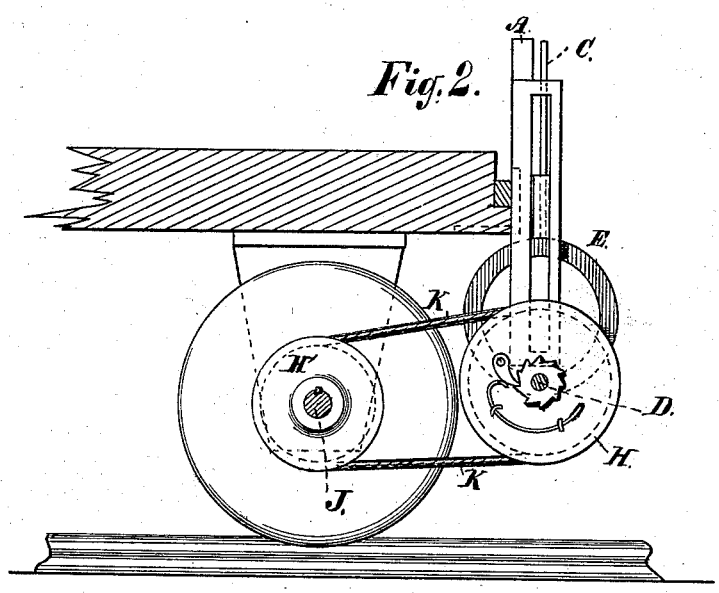

Figure 1 is a front view of the device. Fig. 2 shows a longitudinal section of same attached to a car.

Two frames, as A A, are cast of metal, suitably fastened together to form one portable piece. In these frames A A are formed slots of suitable length to receive and confine two slides, to permit a rising and falling motion to the same, in which slides are inserted the screens C C.

Turning in the lower part of the frames A A, or independent of the same, is the axle D, to which are fastened eccentrically the circles E E, as follows: The axle D is constructed, first, of a complete length of metal. Over one-half of D is slipped a sleeve, D', revolving about the same. To this sleeve is attached the belting-wheel H, having a pawl working on a ratchet-wheel on the axle D. To this sleeve is attached one of the circles E, revolving with it, independently of the axle D. Thus, when revolution is given to the wheel H in one direction, the axle D is moved in a similar direction by the ratchet attachment, while, when H revolves in the opposite direction, only the sleeve is moved, the axle D remaining stationary.

The whole frame A A and combined wheel and axle D are so arranged as to be hung on the platform of a car in suitable slots or supports, the wheel H being below the platform.

To the car-axle J is attached a grooved wheel, H', such wheel moving the belting K, acting on the wheel H of axle D. The axle D, its sleeve, and the circles E E are so arranged that the circles E E are always in opposite positions, and therefore they cannot both raise a screen, C, at the same time, but only by alternation, one at a time.

The frames A A being placed on the rear platform of a car, and the belting K hooked, the operation is as follows: The revolution of the wheel H' by band K imparting a revolution to the wheel H and circles E, the screens C are raised alternately, and interposed between any signal that may be placed in the frames A A, as B, and the eye of the observer. When the car stops the entire motions cease. Should the screen operated by the cam on the axle D stop at a point to cover the signal at the time that a reversed motion of the other screen is beginning, it is supposed the jar of the moving car will cause the cam to always fall, and thus disclose a fixed signal. This could be aided by weighting the portion of the cam farthest from its point of revolution. Its tendency would then be for the weighted part to seek the lowest point.

When the car is backing a contrary revolution is given to the wheel H. This motion by the ratchet arrangement only moves the sleeve to which H is fixed, the axle D not then moving; consequently only one circle E is moved, and of course only one screen C, the other circle E remaining stationary. Thus in a forward movement of the car I have both signals flashing; in a backing movement, only one flashing and one fixed; in a stationary position, both signals fixed.

Thus an engineer can know the three important facts stated above relative to any train in sight, and by a mathematical adjustment of the sizes of the wheels H and H' the speed of a train can be known by the number of flashes given to a signal during any given period of time. This description shows plainly my principle. The mechanism may be considerably varied. For instance, by a beveled gearing on axle D working on a similar geared axle at right angles, the circles E may be made to move in a direction at right angles to the axle D, or by the same movement a solid half-circle may be substituted for E, to pass as a disk before the signal B; or the axle D, by gearing, could revolve another axle with attached blades before B; or the wheel D could be worked by gearing instead of the band K. These points show how the mechanical action may be varied without in any manner departing substantially from the principle I have described.

My idea is also applicable to the slides of a lantern, which might be made to move independently of any attachment to a day-signal.

What I claim as new, and desire to secure by Letters Patent, is—

The combination of the axle D, attached sleeve, wheel and ratchet, and the driving mechanism with signals and covering-screens, all constructed and operated substantially as described, for the purposes as herein set forth.

THEODORE A. B. PUTNAM.

Witnesses:
E. S. BLACKWELL,
THOS. C. MILES.